Figures 1, 1A:
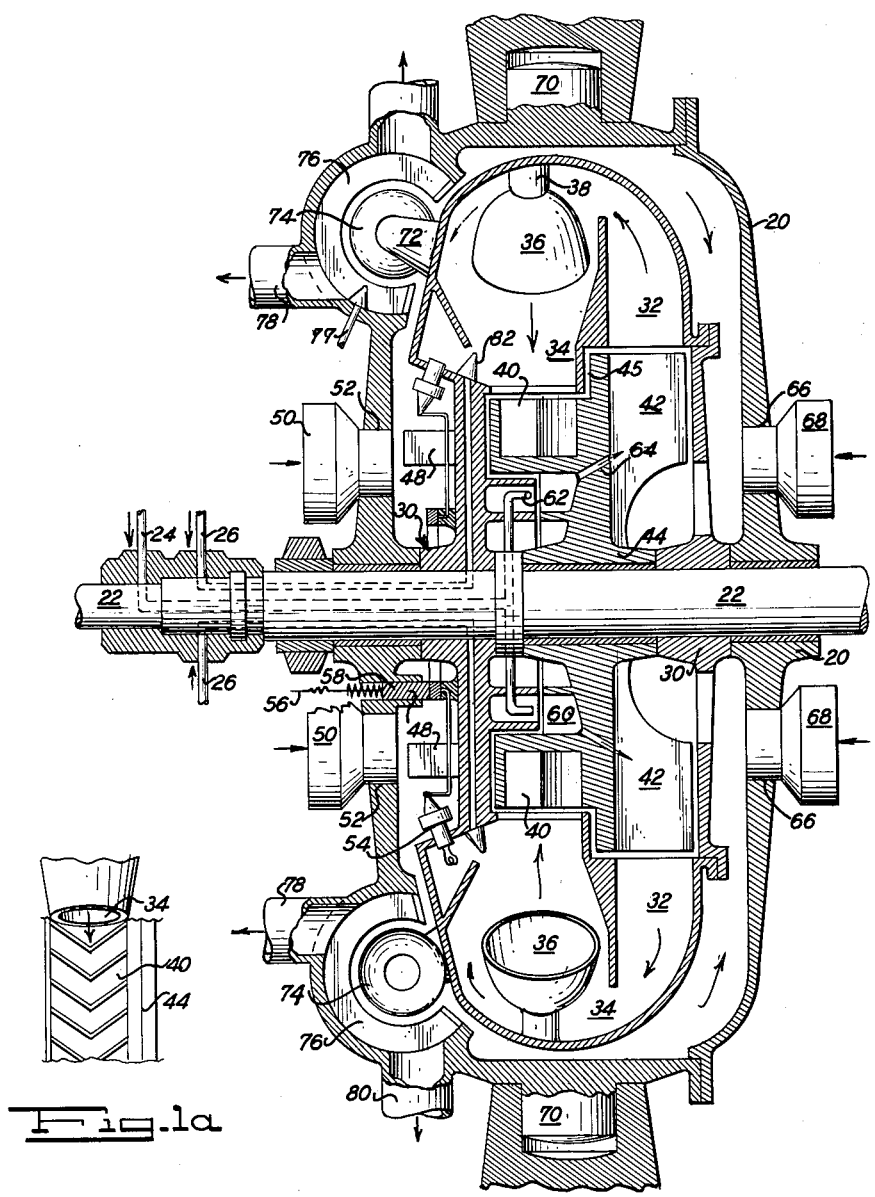

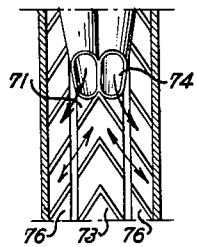
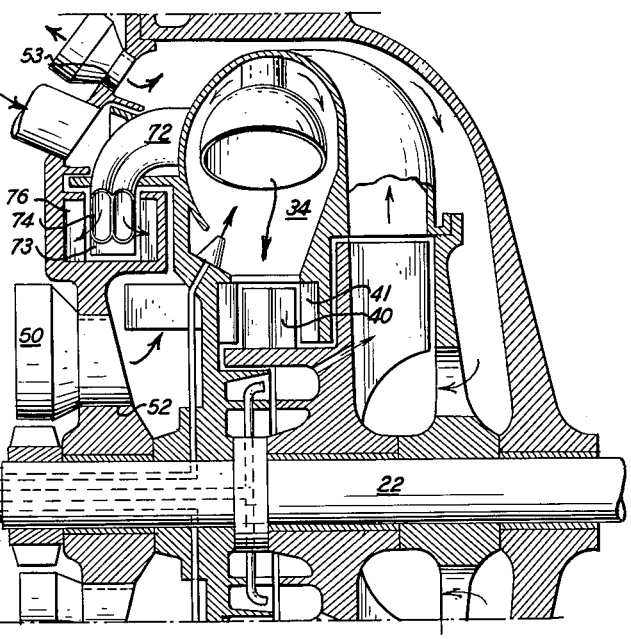
Fig. 3b
Fig. 3
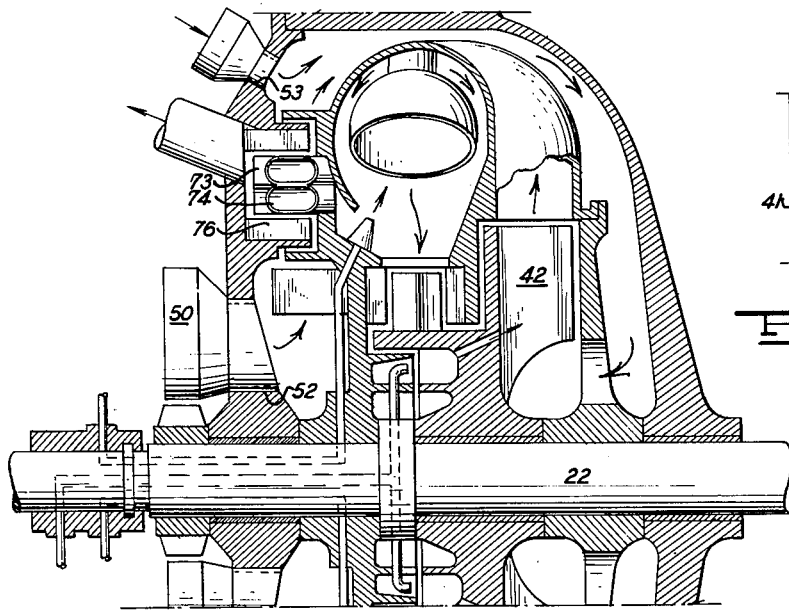
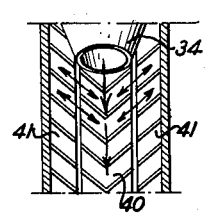
Fig. 3c
Fig. 3a

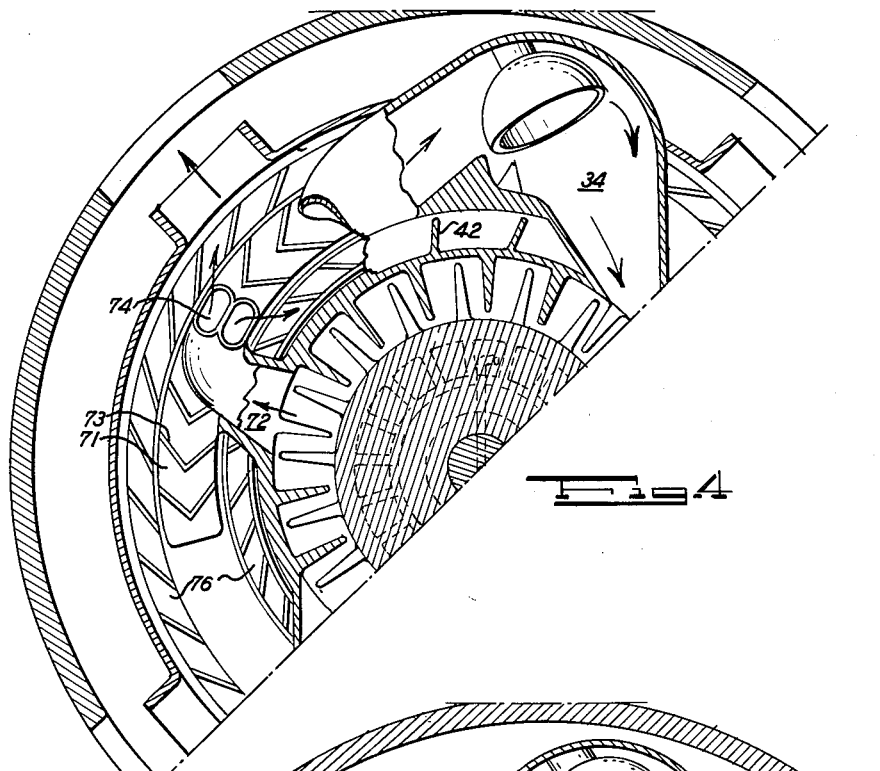
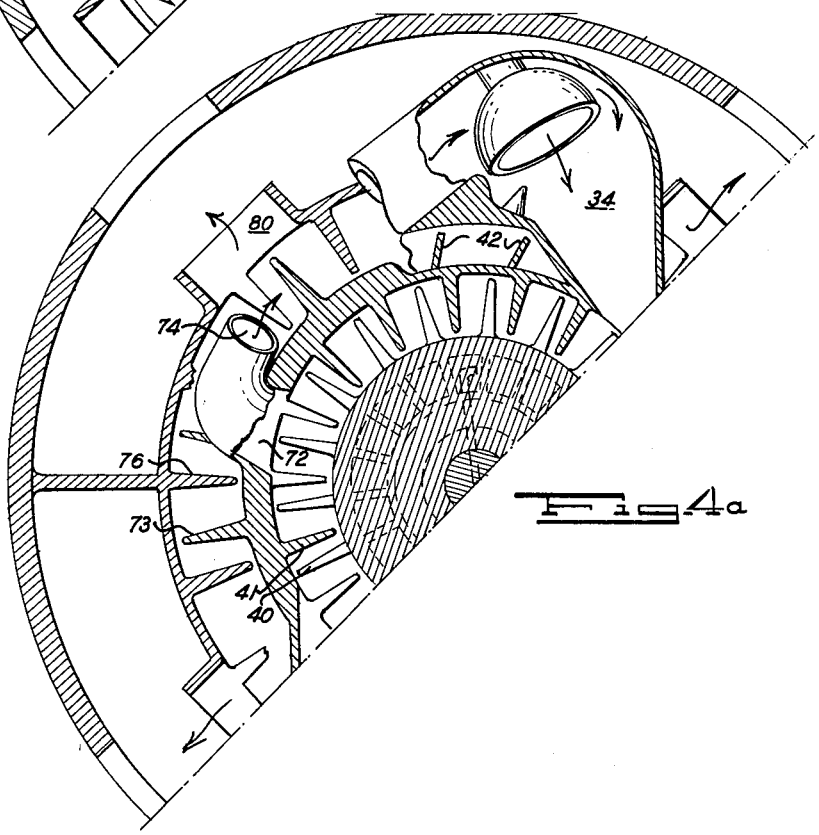

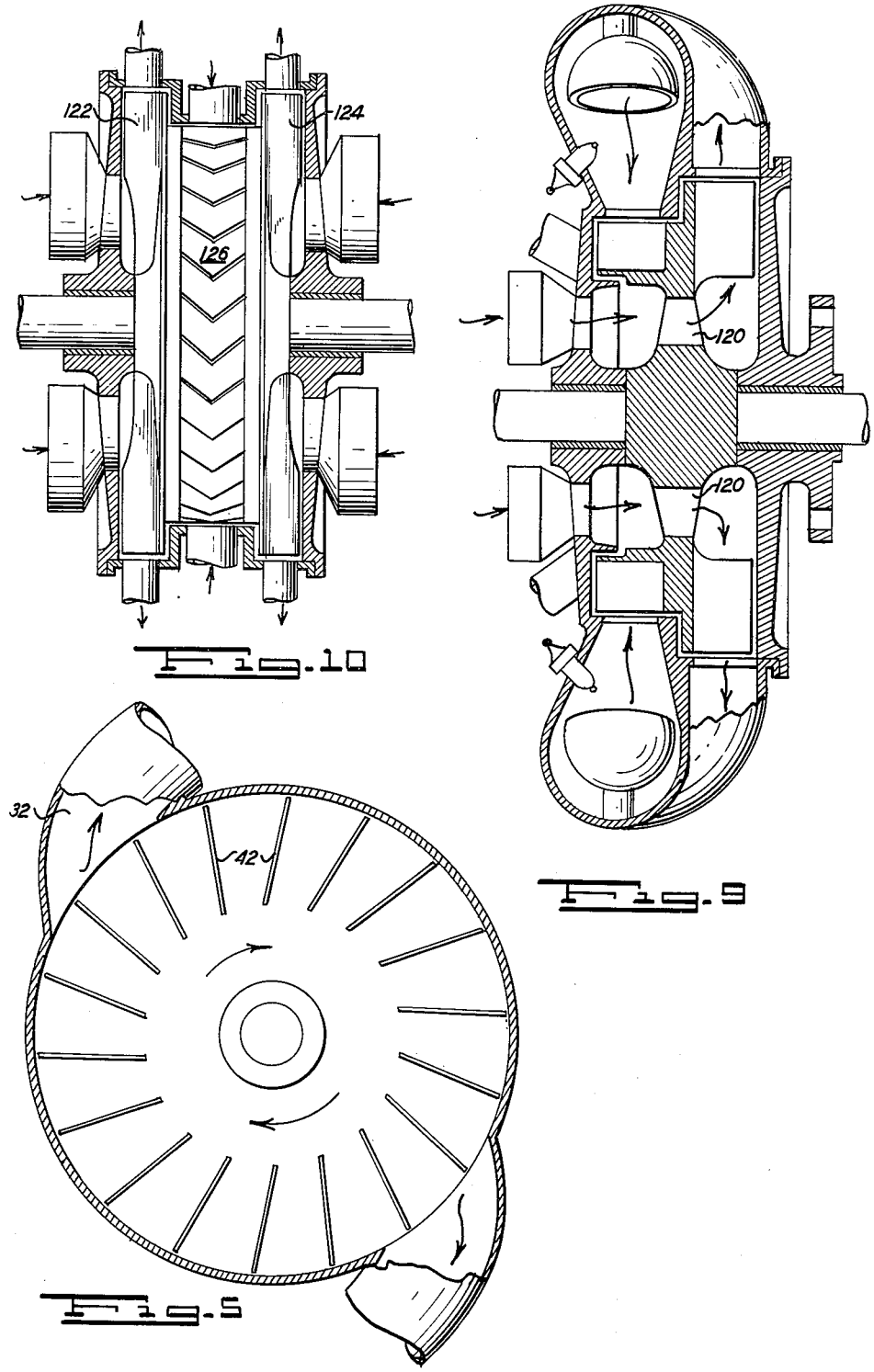

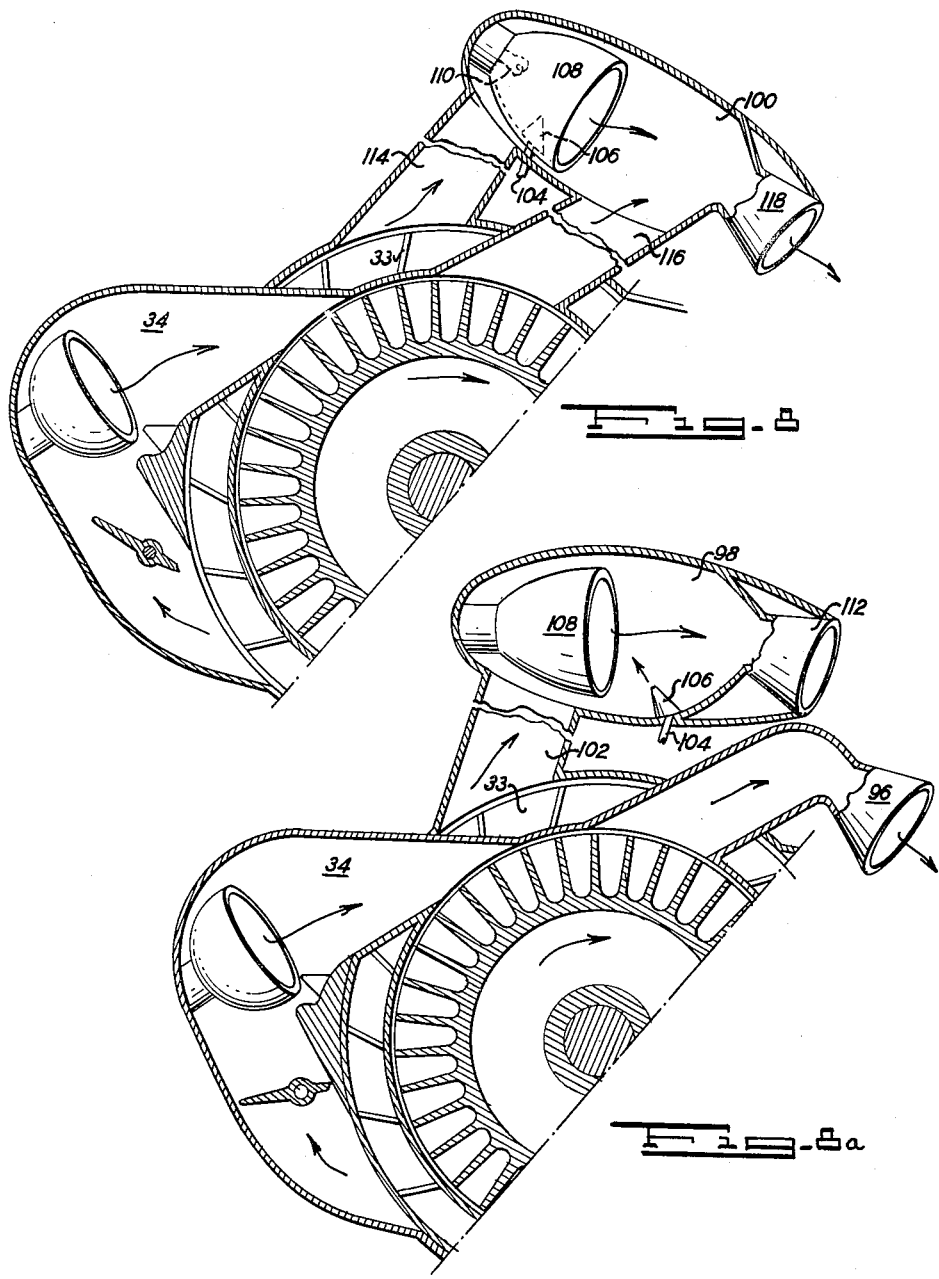

United States Patent Office 3,059,428
Patented Oct. 23, 1962

3,059,428
INTERNAL COMBUSTION TURBINE WITH SUPER-CHARGING TURBINE FOR LIQUID FUELS AND COAL DUST
Walter Otto Galonska, 73 Savignystrasse,
Frankfurt am Main, Germany
Filed June 2, 1958, Ser. No. 739,262
Claims priority, application Germany May 31, 1957
8 Claims. (Cl. 60—39.35)

Gas turbines are known which act as jet propulsion units on turbine rotors. It is also known to arrange gas turbines in a jet assembly to act simultaneously on an air screw or to employ them simultaneously in combined form as a jet propulsion unit and as an air screw driving unit. However, with these forms of gas and internal combustion turbines only a part of the energy of the fuel supplied is utilised, since the exhaust gases leave the turbine at very high speed and are not fully utilised before flowing into the atmosphere.

In the known gas turbines, the current of expanding gases leaving the combustion chamber is directed on to the supercharging rotor, which drives only the supercharger. Thus, the exhaust gases from the supercharging rotor are employed to drive the actual working rotor, the supercharging rotor being arranged independently of the working rotor. The energy still contained in the exhaust gases is lost, so that the turbine cannot be economically employed in many fields of application. In some applications, turbines cannot be employed at all.

The great difficulty in the design of the turbines heretofore employed resides in the heat dissipation. The maximum temperatures are set up at the turbine rotor blades, for which special steel must therefore be employed. Nevertheless, the useful life of such rotor blades is very short. The turbines heretofore employed do not comprise a condensation period in their operating cycle as does the Otto engine, and they are insufficiently cooled. By reason of the nature of the design, no sufficient heat exchange and no sufficient heat dissipation from the turbine rotors is possible, and the existing gas turbines can only be employed for special-purpose aircraft. They are unsuitable for land vehicles and water-borne craft and stationary power plants.

The existing gas turbines consist of fixed combustion chambers, a compressor or supercharger, which is coupled with the turbine rotor in one unit, and the actual propulsion turbine. There is no mechanical connection between the supercharging turbine and the propulsion turbine. The gases still at high pressure flow from the supercharging turbine through guide vanes to the rotor of the propulsion turbine, from which they flow through a pressure reducer and a heat exchanger to the exhaust system.

The supercharger forces the air into fixed combustion chambers, into which fuel is simultaneously injected and in which combustion takes place. The combustion gases flowing from the combustion chambers drive the turbine rotor of the supercharger. The exhaust gases from the supercharger then drive through guide vanes the independently mounted working rotor.

Thus, only the exhaust gases of the supercharging rotor are employed for the propulsion, while the main stream of compressed gases from the combustion chamber first impinges upon the supercharging rotor.

In jet propulsion units for aircraft, on the other hand, the entire energy from the combustion chambers is employed to drive the supercharger. Pure jet propulsion units operate in accordance with the reaction principle and are therefore also not connected to an air screw. The useful energy is provided only by the jet ejected through a nozzle.

In a gas turbine having fixed combustion chambers, there are set up between the combustion chamber and the turbine rotor active and reactive forces which are converted into the energy supplied to the chambers.

The energy emitted by the combustion chambers is again divided into kinetic energy and potential energy, in dependence upon the active and reactive forces, so that about 50% are again consumed. Thus, only a fraction of the supplied energy remains as useful kinetic energy as pure power. In the best gas turbines heretofore known, the energy utilisation does not amount to 25% of the energy utilisation in Otto and diesel engines, regardless of whether propulsion turbines or pure jet turbines are employed.

It will be apparent from the foregoing that efforts must be made to extract as little energy as possible for the supercharger of the turbine, because this energy is extracted from the useful energy.

From this observation, it may be concluded that the following requirements should be met in the construction of gas turbines: The very high reactive forces of the combustion chambers and of the supercharging and working rotors must be converted into kinetic energy, in accordance with Oechelhäuser's opposed-piston principle. The energy which has heretofore flowed into the atmosphere without being utilised must be converted into rotational energy on the reaction principle, and the working rotor must be driven at high speed through thrust nozzles. The main expansion stream from the combustion chambers must drive the supercharging rotor and the working rotor in common at very high speed in the first stage. The exhaust gases from the first stage should drive the working rotor on the reaction principle in a second and further working stages. Consequently, the working rotor must be designed as a rotating jet propulsion unit. The turbine rotors should have a condensation period for reducing the rotor temperature. More especially, heat dissipation similar to that in the Otto and diesel engines should be rendered possible in order to afford a greater useful life. The gas turbine should operate with any fuel, either liquid or pulverous, with optimum energy utilisation and should be suitable for all land, sea and air craft and for stationary power plants. Both rotors, i.e. the supercharging rotor and the working rotor, must be driven by the main expansion stream in accordance with the principle of opposed-piston engines, one piston constituting the supercharging rotor and the other piston the working rotor, and the two rotors being driven at different speeds independently of one another with load equalisation in accordance with the energy requirements.

The internal combustion turbine according to the invention which comprises a supercharging turbine, is distinguished by the fact that the turbine housing is designed as a useful energy turbine constituting the actual working turbine, also called the working rotor.

Provided on the housing are radial pipe bridges extending from the supercharger space to the turbo-rotor space. These pipe bridges are designed as combustion chambers and are so arranged that at the full expansion pressure the entire kinetic energy of the high-pressure gas leaving the combustion chambers drives the working rotor and the driving rotor for the supercharger, and the supercharger rotor wheel for the coaxial rotation.

The combustion chambers are pear-shaped and comprise an expansion head as a power impulse carrier for the supercharger and the working rotor to which the fuel is supplied.

The combustion chamber housing may be designed as a working rotor and may be arranged to rotate about a fixed shaft or fixedly connected to a rotating shaft. The two rotors, i.e. the supercharging rotor and the working rotor, are then coaxially rotatably mounted in a stator.

The distance travelled by the high-pressure gases from the combustion chamber in the turbo-rotor space is very short. They briefly pass over the rim of the turbo-rotor and a few degrees after entering the turbo-rotor space they return to the rotating working rotor housing and enter exhaust gas pipes designed as exhaust gas thrust nozzles. The exhaust gas pipes are bent over in the direction of rotation immediately after issuing from the housing to form exhaust gas nozzles, so that the working rotor is further driven in its direction of rotation as a jet propulsion unit with the exhaust gas thrust nozzles in a second working stage. The exhaust gases still at very high pressure still have a very high discharge velocity in the exhaust gas thrust nozzle and are passed through the thrust nozzle to a further diffuser or rotor stage for use as kinetic and driving energy in a third and a fourth working stage.

The same kinetic energy of the expansion pressure in the combustion chamber space is thus here opposed by equal impulses (the expansion head of the combustion chamber), i.e. the working rotor and the turbo-supercharger wheel. This arrangement operates in the same manner as a piston prime mover having opposed pistons, for example as in the Oechelhäuser principle, wherein the same kinetic energy of the expansion pressure is opposed by the two pistons as equal impulses, except that in the turbine described here the two impulses, i.e. the turbo-supercharger wheel and the working rotor are moved at different speeds and their loads are balanced in accordance with the energy requirements. The kinetic energy is not here divided into reactive and active forces as in the case of turbines having stationary combustion chambers, but into active forces (kinetic energy) on both sides. The expansion head in the combustion chamber space, which at the same time performs the function of a hot bulb, is the burner and the actual impulse carrier of the expansion pressure set up by the kinetic energy of the high-pressure gas, which applies the kinetic energy of the high-pressure gas to the counter-impulse, i.e. the turbo-supercharger space, and drives the turbo-supercharger rotor and the working rotor with the combustion chambers and the exhaust gas thrust nozzles independently of one another at different speeds for the coaxial rotation. The useful energy is thus already present in the combustion chamber in the first working stage with at least the same increase in utilisation value as from the simple piston engine to the opposed piston engine, which amounts to about 50% in the latter engines, in relation to the fuel energy supplied.

The turbo-supercharger wheel, as a reaction wheel, rotates at high speed independently of the driving rotor, with the rotating combustion chambers and thrust nozzles designed as a combustion chamber wheel, and charges the rotating combustion chambers to high and ultra-high pressure, the reaction wheel and the combustion chamber wheel being automatically balanced in load in accordance with the pressure conditions. When the speed of the combustion chamber wheel is reduced as a result of high energy requirements, the reaction wheel reacts at higher speed and consequently with higher supercharging on the combustion chamber and brings the combustion chamber wheel to higher output and to speed stability.

The thrust effect of the exhaust gas thrust nozzles imparts to the rotating combustion chamber wheel in a second working stage a large additional energy impulse, which has great speed stability in its power ratio in the movement of large masses owing to the large leverage of the thrust nozzles.

The kinetic energy of the gas still at high pressure which leaves the thrust nozzle is opposed by a fixed turbine stator. The rotating thrust nozzles are enclosed by the fixed turbine impeller, which is fixedly disposed on the stator or a third point, such as the fuselage of an aircraft. The exhaust gas nozzles and the diffuser are so arranged relative to one another that the cones of the nozzles, which are designed as thrust nozzles having a counter-thrust cone, are operated at the varying flow pressure. The turbine thus here operates in three stages with the entire kinetic energy of the high-pressure gas:

(1) Combustion chamber expansion (opposed-piston action).

(2) Thrust nozzle action.

(3) Counter-pressure thrust action.

The kinetic energy of the high-pressure gas, i.e. the main expansion pressure from the combustion chamber, is thus here more completely converted into kinetic energy for driving machines or vehicles than in any known propulsion unit.

The exhaust gases are guided into headers in the diffuser, from which they flow into the atmosphere.

The exhaust gas thrust nozzles or the diffuser may be provided with an after-burner, in which further fuel may be injected into the exhaust gases for boosting the power of the turbine.

The fuel fed to the combustion chambers in this turbine are guided through the rotating working rotor of the combustion chamber wheel and through the supercharging rotor of the reaction wheel. As a result of the rotation of the rotors with the fuel supply ducts, the fuel supplied is fed by the high centrifugal forces set up into the combustion chamber or into the combustion chamber head in extremely fine form and with better atomisation than with normal injection pumps. When the turbine is operated with coal dust, the coal dust is injected into the combustion chambers ready for burning by the high centrifugal forces of the rotating fuel supply ducts and is impregnated until it becomes self-igniting. This atomisation of coal dust by means of centrifugal force in a form ready for combustion cannot be effected by any pump or compressor. The moisture content of the coal dust may be varied as desired in this turbine.

By means of the varying degrees of centrifugal force produced by the reaction wheel (turbo-rotor wheel) and the combustion chamber wheel (working rotor) as a result of their varying speeds, this turbine may be operated with various liquid and solid fuels such as benzine, diesel oil, heating and crude oil, tar oil, hydrogen peroxide, nitric acid, alcohol, coal dust or liquid oxygen, fed through the reaction wheel and the combustion chamber wheel and acting as catalyst and reactant. All liquid or solid fuels which cannot normally be atomised into a form ready for combustion by high pressures are here fed in atomised form ready for combustion to the combustion chambers from the combustion chamber wheel and the reaction wheel due to the high speeds and the high centrifugal forces thereby set up.

The turbine requires no special cooling. All the parts lie in the rotary air stream and are sufficiently cooled by small blowers disposed on the combustion chamber wheel. The heat dissipation is here generally determined by the law of centrifugal forces, both in the reaction wheel and in the combustion chamber wheel. The high turbine and rotor temperatures set up in the turbines heretofore known, which result in burning of the rotors and of the blades thereof, cannot occur here. The temperatures in the turbines described here remain below those which are set up in existing Otto and diesel engines. The turbine described here moreover has a condensation period as in the known Otto engines. When the expansion has taken place in the combustion chamber, the supercharger forces fresh air into the combustion chamber. As a result of the rotation of the combustion chamber, the air supplied by the supercharger is highly compressed and whirled in the combustion chamber and accelerates the combustion processes in the combustion chamber head and produces a condensation period for the rotor space. In the existing turbines, this supply of sprayed into the expansion head 36 by means of the nozzles 82. At starting, the ignition equipment 38, 54 is also set in operation, so that the combustion of the fuel-air mixture in the combustion chamber and especially in the expansion head 36 commences. The expanding gases impinge upon the ring of blades 40 and increase the relative speed between the combustion chamber wheel and the reaction wheel. After passing through the reaction wheel, the hot gases leave the latter through the next nozzle tube 72 and are ejected through the nozzle 74 against the blade ring 76 of the stator 30. They are thus further utilised and effect an increase and stabilisation of the speed of the combustion chamber wheel. The gases leave the turbine by way of the outlet ducts 78 and 80.

It is also possible to supply further fuel through a fuel pipe 77 in the final stage, such further fuel burning in the blade ring 76, since it is ignited by the hot gases. This device may serve for producing accelerations which are suddenly required. The air supplies in the stator 52 and 66 are regulatable. The supercharger sucks non-preheated fresh air through the air inlet 66 on the supercharger side of the stator and feeds non-preheated combustion air to the combustion stator. When the air inlets 66 are shut off, the supercharger sucks fresh air through the air inlets 52, this fresh air having to pass around the heat-generating combustion chamber wheel and being fed in highly preheated state from the supercharger to the combustion chambers. The air inlets 66 and 52 are regulatable in relation to one another in accordance with the required turbine temperature for the purpose of feeding more or less cold or warm air to the turbine and to the combustion chambers.

FIGURES 3, 3a, 4 and 4a show different constructional forms of the nozzle tube 72 of the nozzles 74 and of the blade arrangement 76. The nozzles are interconnected by a divided ring 71 provided with special blades 73 which interact in the manner indicated by arrows in FIGURE 3b with the guide blades 76 mounted on the stator and thus produce an increase in the speed and an optimum utilisation of the exhaust gases.

In addition, in the constructional form according to FIGURES 3, 3a, 4 and 4a there are provided in association with the blades 40 of the reaction wheel special counter-pressure blades 41 on the combustion chamber wheel, the manner of operation of which, as illustrated in FIGURE 3c, is similar to that of the co-operating blade rings according to FIGURE 3b, and which improve the utilisation of the energy, since they assist in increasing the relative speed between these rings, the reaction wheel and the combustion chamber wheel.

In addition, in the constructional form according to FIGURES 3, 3a, 4 and 4a, no fresh air inlets are provided on the supercharger side of the stator. The supercharger sucks in fresh air through the air filters 50 and the air inlets 52, the said fresh air being guided around the heat-generating combustion chamber wheel and being fed in highly preheated state to the combustion chambers as combustion air. For regulating the required turbine temperature by means of cold air additions, regulatable fresh air inlets 53 are provided on the stator at the level of the combustion chamber of the turbine.

FIGURE 5 shows the arrangement of the supercharging blades 42 of the reaction wheel and the extensions of the pipe bridges 32, which form a part of the combustion chamber wheel. The combustion chamber wheel is sealed from the reaction wheel by an annular chamber packing.

Figure 6:
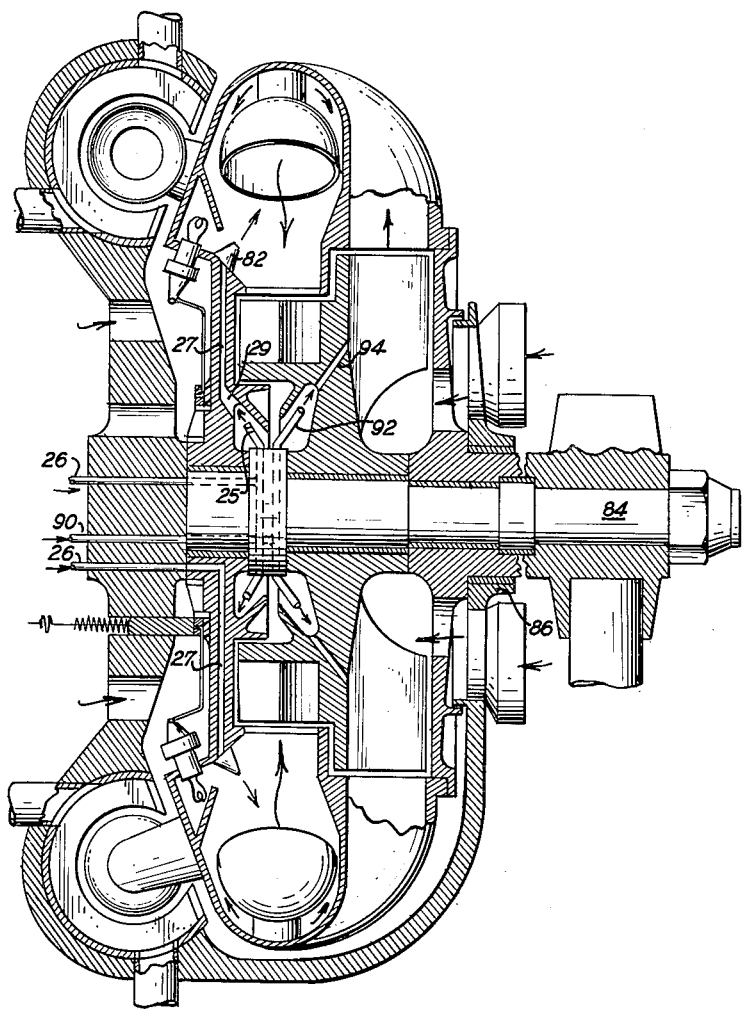

As a result of the high speed of rotation of the combustion chamber wheel, it is possible to cause the fuel to flow freely into the fuel passages 27 illustrated in FIGURE 6, since it is forced outwardly into the nozzles 82 by the centrifugal force. The fuel thus flows from the duct 26 to an outlet nozzle 25, from which it is projected into the space 29 and sucked away through the duct 27 as a result of the centrifugal force.

Figure 7:
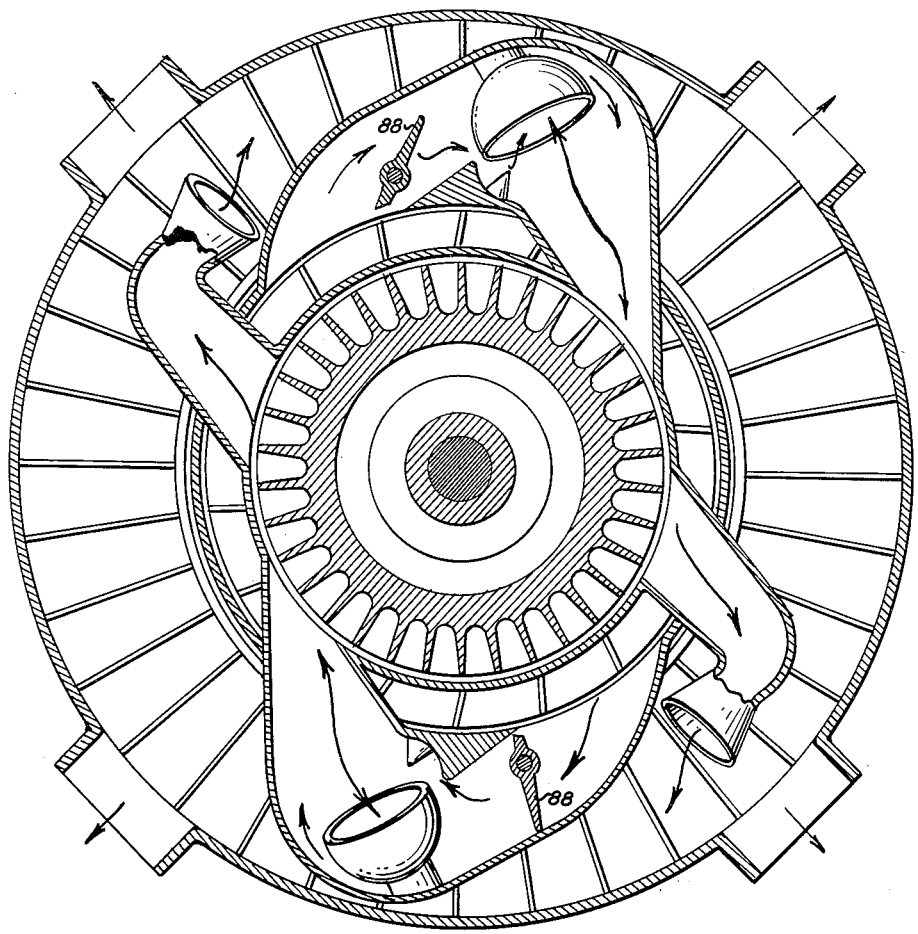

In FIGURES 6 and 7, the combustion chamber rotor and the supercharging rotor (reaction wheel) are rotatably mounted on a fixed shaft. The manner of operation is here the same as in the case of the turbine according to FIGURES 1 to 4, with the difference that the combustion chamber rotor and the reaction wheel rotate about a fixed overhanging shaft. However, in the case of larger units it is advantageous to provide a further support for the shaft in front of the housing, as in the construction according to FIGURE 6 at 86. In the case of small turbines, such a support is not required.

The actual power transmission takes place from the rotating housing either directly or by way of a reduction or reversing gear. The unit to be driven, for example an air screw, is driven from the rotating housing, the bearing cover of the housing of the combustion chamber rotor being designed as an extended hollow shaft for receiving an air screw. The air screw is mounted on the fixed shaft 84 and is driven by the rotating housing either directly or through a gearing.

FIGURE 7 also shows a non-return valve 88 which may also be employed in the constructional forms according to FIGURES 1 to 5. However, the necessity for such a non-return valve depends upon the design of the combustion chamber.

In FIGURE 6, there is provided in addition to the fuel supply duct 26 a second fuel supply duct 90, the outlet ends of which terminate at 92 in front of inclined bores 94. By means of this second fuel duct 90, 92 and the bores 94, readily ignitable fuel can be supplied through the pipe bridges for starting the turbine, while fuels which are of higher specific gravity or which ignite less readily can be fed to the combustion chambers through the direct fuel supply duct 26, 27. In addition, the duct 90 may be provided as an additional means of injection for particularly high outputs, for example at the take-off of aircraft. It is also possible to inject liquid oxygen through the duct 90 for producing ultra-high outputs.

In the arrangement according to FIGURES 8, 8a, the combustion chamber wheel and the supercharging wheel rotate about a fixed shaft. The combustion chamber wheel supports an exhaust gas thrust nozzle 96 in addition to the combustion chambers 34. Moreover, combustion chamber nozzles 98 and 100 are provided, which are illustrated in two different constructional forms in FIGURES 8, 8a. The combustion chamber nozzle 98 is fed directly by the supercharging space 33 and thus receives fresh air through the passage 102, while fuel is fed to a spray nozzle 106 through the fuel duct 104. The fuel-air mixture is ignited in the expansion head 108 by means of the ignition system 110 and effects an ejection from the nozzle part 112 situated at the rear end. The combined exhaust gas and combustion chamber nozzle 100 receives fresh air from the supercharging space 33 by way of the passage 114. The combustion takes place in the same manner as in the combustion chamber nozzle 98. In addition, a passage 116 is connected to the housing surrounding the blade ring of the reaction wheel and supplies to the combustion chamber space 100 the still hot and expansible gases which are then ejected together with the freshly ignited combustion gas through the nozzle 118. This turbine according to FIGURES 8, 8a operates substantially in the same manner as the nozzles disposed in the blade tips of helicopters and driving the helicopter blades by means of their back thrust. The combustion chamber nozzles may also be fed with compressed air from a separate unit in the aircraft. It is naturally also possible to design the passages 102, 114 and 116 and the passage 96 as helicopter blades, to the ends of which the nozzles will then be secured in the manner of nacelles so as to drive the helicopter blades. The main part of the turbine will then be formed by the blade hub.

FIGURE 9 shows a gas turbine in which the housing with the combustion chambers is fixed and does not rotate. The reaction wheel forms at the same time the fresh air to the rotor space is impossible by reason of the fixed design of the combustion chamber.

The stator of this turbine is designed as a stator housing and completely surrounds the combustion chamber wheel with its reaction wheel.

In the operation of the turbine, a very high heat evolution occurs in the stator due to the very high temperatures produced by the combustion chamber wheel. The evolution of heat, however, is utilised to preheat the fresh air sucked in by the supercharger without the use of any special heat exchangers for increasing the thermal efficiency of the turbine.

The heat may also be dissipated into the atmosphere through air inlet and outlet apertures in the stator and by means of blowers disposed on the combustion chamber wheel.

By reason of the construction of this turbine, the stator forms an excellent heat exchanger, in that the fresh air sucked in by the supercharger is guided around the heat-evolving combustion chamber wheel and is fed in highly preheated state to the combustion chambers, while at the same time the combustion chamber wheel with its reaction wheel is sufficiently cooled by the suction air stream.

The supercharger completely sucks away the heat developed by the combustion wheel and utilises it for preheating the fresh air sucked in and for supercharging the combustion chambers with preheated combustion air. The specific fuel consumption is very greatly reduced by this highly preheated combustion air fed to the combustion chambers, and the combustion processes are thereby considerably accelerated, and the fuel energy fed to the combustion chambers are highly utilised for kinetic energy.

For accelerating the circulation of air around the combustion chamber wheel, auxiliary blowers may be provided on the combustion chamber wheel. Moreover, fresh air may be supplied from both sides of the stator, such fresh air being adjustable by means of the addition of cold air or hot air to the turbine, depending upon the turbine temperatures.

In addition, all or part of the exhaust gases may be guided from the header or the exhaust gas outlet ducts in regulatable fashion to the stator for further utilisation of the thermal efficiency for the preheating of combustion air.

The thermal efficiency of this turbine is higher and more fully utilised by reason of the construction than in any known propulsion unit. More especially, the known gas turbines are provided with special complicated, extensive and costly heat exchangers and have only reached a small fraction of the thermal efficiency of the new turbine described here.

The stator of this turbine is provided with journals for the pivotal suspension or mounting of the turbine in a vehicle or aircraft. The turbine may be so mounted in its suspension as to be pivotable or universally pivotable. With this universally suspended turbine, it is possible not only to steer or control air craft but also to take off vertically by reason of the pivotability of the turbine, or to take off from and land on short runways.

The constructions described here may be designed for all land, sea and aircraft as also for all stationary power plants of any size.

Figure 2:
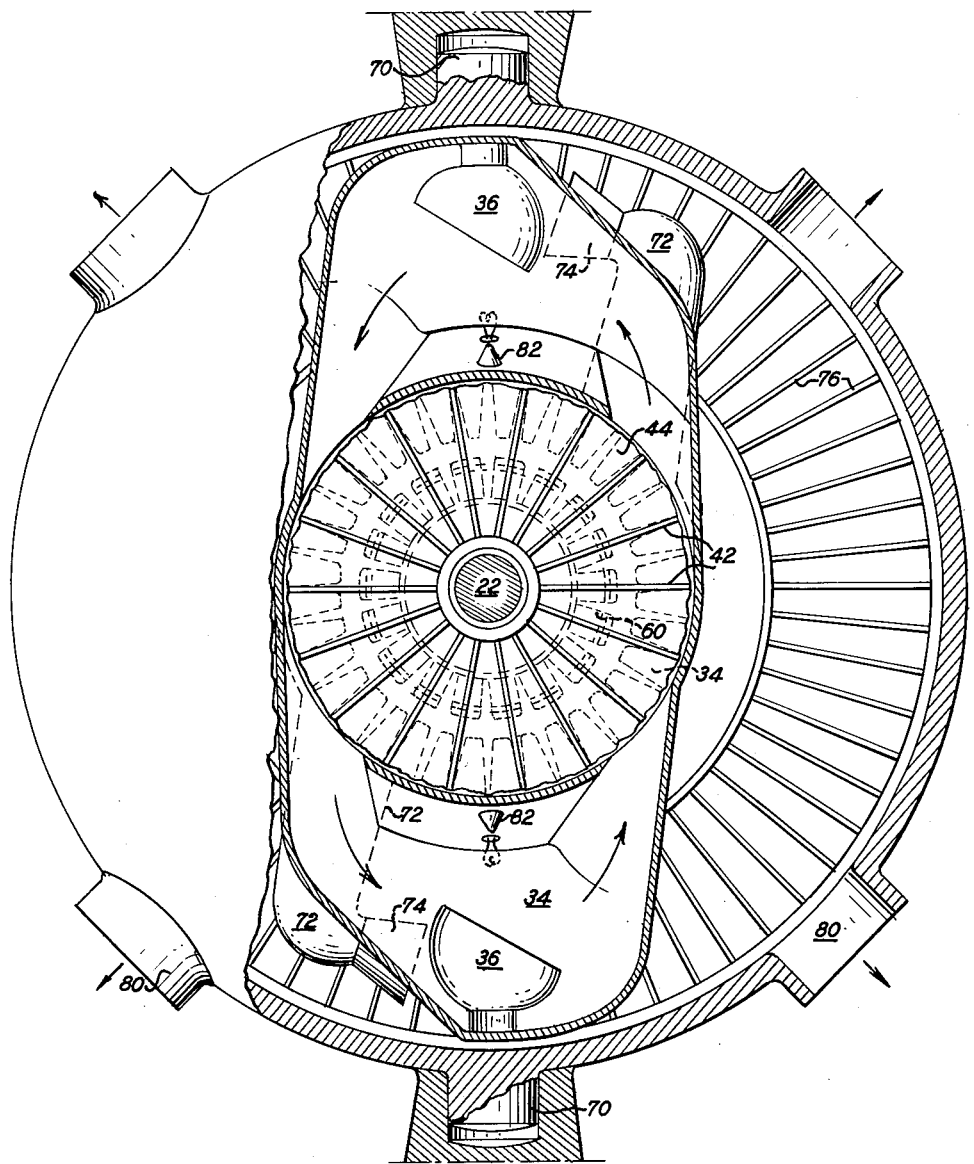

The invention will hereinafter be more fully explained with reference to the accompanying drawings, in which:

FIGURE 1 is an axial section through an internal combustion turbine according to the invention, FIGURE 1a illustrates the design of the blade ring of the reaction wheel with the combustion chamber outlet, FIGURE 2 is a vertical section through FIGURE 1, FIGURES 3 and 3a are axial sections through a further constructional form of the turbine according to the invention, FIGURE 3b illustrates the arrangement of the exhaust gas nozzles with respect to the housing of the second and third working stages, FIGURE 3c illustrates the combustion chamber outlet leading to the reaction wheel blading and the combustion chamber wheel blading of the first working stage, FIGURES 4 and 4a are radial sections through the constructional form corresponding to FIGURE 3, FIGURE 5 illustrates the construction of the supercharging side of the rotor, FIGURE 6 is an axial section through a further constructional form according to FIGURE 4, FIGURE 7 is a radial section through a constructional form according to FIGURE 6, FIGURES 8 and 8a are radial sections through an internal combustion turbine according to the invention, comprising exhaust gas thrust nozzles, FIGURE 9 is an axial section through a gas turbine according to the invention in which the housing with the combustion chambers is fixed, and FIGURE 10 is a simplified view of a gas turbine according to the invention, in which the rotor is provided with supercharging blowers on both sides.

In all the figures, the directions of movement of the rotating parts and of the fresh air, of the fuel, of the compressed air and of the gases are indicated by arrows.

As is shown in FIGURE 1, there is mounted in a fixed housing 20 a driving shaft 22, with axial supply ducts 24 for the starting compressed air and 26 for fuel. Mechanical energy can be derived through a driving pinion 28. Fixedly mounted on the shaft is a combustion chamber wheel 30, on which there are pipe bridges 32, which are designed as combustion chambers at 34. Disposed in the upper part of the combustion chamber 34 is an expansion head 36 with a glow plug or glow ignition coil 38.

The opening of the expansion head is directed towards the ring of driving blades 40 of a reaction wheel 44 on which the rotor blading 42 is mounted. The combustion chamber wheel 30 supports the blower blades 48, which suck in cooling air through the air filters 50 and the apertures 52. For producing a satisfactory combustion, special ante-chamber ignition device 54 are provided, which are fed through the conductor 56 and through carbon brushes 58.

Disposed in the internal space within the small ring of blades 40 of the reaction wheel is a further ring of blades 60, opposite which there are disposed compressed air nozzles 62 connected to the duct 24. This is particularly clear from FIGURE 2. The reaction wheel has formed therein bores 64, which establish communication between the ring of starter blades 60 and the ring of supercharging blades 42. Air filters 68 are disposed in front of the air intake apertures 66. The housing of the turbine may be pivoted about the journals 70 and may if required be universally suspended. The combustion chamber wheel supports in addition to the pipe bridges 32 outwardly extending nozzle tubes 72, the outlet ends of which are designed as nozzles 74. Arranged radially opposite to the said nozzles are blades 76 on the housing. The said blades 76 are arranged in the form of an arc around the nozzles 74. Outlet ducts 78 and 80 are connected to the said ring of blades 76.

The internal combustion turbine operates in the following manner:

For starting, compressed air is forced through the duct 24 and the compressed air nozzles 62, the said compressed air impinging upon the blades 60 of the reaction wheel and coaxially rotating the latter and the combustion chamber wheel. The compressed air passes through the bores 64 into the supercharging space and flows from here, together with the fresh air entering through the filters 68 and the apertures 66 in the movement of the reaction wheel, through the pipe bridges 32 into the combustion chamber 34. At the same time, fuel is injected through the ducts 26 and, after passing through the passages, is driving rotor. This rotor, however, is apertured at 120, so that the cold air stream flows through the wheel and cools the blading thereof, especially on the combustion chamber side.

The gas turbine according to FIGURE 10 comprises a rotor, on both sides of which supercharging blowers are disposed. The turbine blades on which the combustion chambers act lie at the centre. The cooling air stream which flows between the two blade rings 122, 124 of the supercharger thus effects at the same time a cooling of the blade ring 126 acted on by the combustion chambers. The combustion chambers are fed by two superchargers.

The constructional forms according to FIGURES 8 and 10 may also be employed as a gas turbine, or as a blower and compressor, or again as an exhaust gas turbine supercharger. Instead of the combustion chambers, exhaust gas ducts extend from piston engines to the rotor so that the latter is driven by the exhaust gases from the piston engines, which are still at high pressure. The exhaust gas supercharging turbines are known per se and are employed to increase the outputs of Otto and diesel engines.

I claim:

1. An internal combustion turbine engine comprising a rotary compressor, coaxial rotary means comprising a series of combustion chambers mounted radially outwardly of the compressor for counterrotation with respect thereto in a position to receive a charge of compressed air delivered thereto by the compressor and to convey the charge around a path of greater radius than the compressor, thereby further to compress the charge in the combustion chambers, means for delivering fuel to the combustion chambers for combustion with the charge, manifold means defining radially inward paths of flow for the combustion gases issuing from the combustion chambers, thereby to cause centrifugal throttling of the combustion gases, and a coaxial turbine mounted radially inwardly of the combustion chambers, in a position to receive the combustion gases conducted thereto by the manifold means, and drivingly connected to the compressor.

2. An engine as in claim 1 comprising a housing enclosing the combustion chambers and surrounding the compressor and turbine.

3. In an engine as in claim 2 wherein the housing is fixed, journals in the housing, rotary shaft supported by the journals, the rotary means being fixed to the shaft and the compressor and turbine being rotatable on the shaft, and a power take-off extending from the shaft.

4. In an engine as in claim 2 wherein the housing is rotatable, bearings in the housing, a fixed shaft journalled in the bearings, the rotary means and the compressor and turbine being rotatable on the shaft, and a power take-off extending from the housing.

5. An engine as in claim 2 comprising first air inlet means in the housing communicating directly with the compressor, second air inlet means in the housing, and means conducting air from the second inlet means inside the housing around the rotary means and combustion chambers into the compressor.

6. In an engine as in claim 2, manifold means fixed to the rotary means defining gas outlet nozzles from the turbine, a ring of blades on the housing operatively associated with the nozzles to define an expansion stage, and venting means leading from the ring of blades to atmosphere.

7. An engine as in claim 6 further comprising supply means for injecting after-burner fuel into the expansion stage.

8. An engine as in claim 1 further comprising a ring of starter blades on the turbine, means for injecting starting air against the starter blades, and venting means communicating from the starter blades to the compressor.

References Cited in the file of this patent

UNITED STATES PATENTS

| | | |
|---|---|---|
| 1,021,521 | Heroult | Mar. 26, 1912 |
| 2,444,742 | Lutjen | July 6, 1948 |
| 2,508,685 | Peterson | May 23, 1950 |
| 2,709,889 | Mount | June 7, 1955 |
| 2,850,250 | Smith | Sept. 2, 1958 |

FOREIGN PATENTS

| | | |
|---|---|---|
| 934,755 | France | Jan. 19, 1948 |
| 1,139,818 | France | Feb. 18, 1957 |
| 485,826 | Italy | Oct. 19, 1953 |
| 63,354 | Norway | Mar. 17, 1941 |